(12) United States Patent
Binder et al.

(10) Patent No.: US 7,670,697 B2
(45) Date of Patent: Mar. 2, 2010

(54) FUEL CELL SYSTEM WITH FUEL CELL UNIT HAVING MEANS FOR STORING OR DISPENSING ELECTRICAL ENERGY

(75) Inventors: Juergen Binder, Filderstadt-Plattenhardt (DE); Eberhard Schoch, Stuttgart (DE); Ulrich Gottwick, Stuttgart (DE); Rainer Saliger, Bamberg (DE); Gunter Wiedemann, Ludwigsburg (DE); Frank Baumann, Mundelsheim (DE); Arthur Schaefert, Buehlertal (DE); Jens Intorp, Ulm (DE); Jan-Michael Graehn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 994 days.

(21) Appl. No.: 11/208,221

(22) Filed: Aug. 19, 2005

(65) Prior Publication Data
US 2006/0046105 A1 Mar. 2, 2006

(30) Foreign Application Priority Data
Aug. 19, 2004 (DE) .................. 10 2004 040 138

(51) Int. Cl.
*H01M 8/00* (2006.01)
*H01M 8/04* (2006.01)

(52) U.S. Cl. .................. 429/12; 429/23; 429/13; 429/22

(58) Field of Classification Search .................. 429/17, 429/19, 23
See application file for complete search history.

(56) References Cited

U.S. PATENT DOCUMENTS

| 5,945,229 | A | 8/1999 | Meltser |
| 6,322,917 | B1 * | 11/2001 | Acker ........................... 429/17 |
| 2002/0182461 | A1 * | 12/2002 | Hasuka et al. ................. 429/23 |

\* cited by examiner

*Primary Examiner*—Dah-Wei D Yuan
*Assistant Examiner*—Zachary Best
(74) *Attorney, Agent, or Firm*—Michael J. Stiker (57) ABSTRACT

A fuel cell system has at least one fuel cell unit for generating electrical energy, a unit for storing or dispensing electrical energy, an electrical consumer for consuming electrical energy, a diagnostic unit for ascertaining a functional capability of the at least one fuel cell unit during a diagnosis phase, and a control unit for determining an electrical power generated at least during the diagnosis phase by the at least one fuel cell unit.

15 Claims, 4 Drawing Sheets

Fig. 1

$$U = P_1 + P_2 \ln\frac{I}{P_3} + P_4 \cdot I + P_5 \cdot I^{(P_6+1)}$$

Fig. 2

$$m_i = m_0 + \sqrt[3]{a(t-t_0)}$$

FUEL CELL SYSTEM WITH FUEL CELL UNIT HAVING MEANS FOR STORING OR DISPENSING ELECTRICAL ENERGY

CROSS-REFERENCE TO RELATED APPLICATION

The invention described and claimed hereinbelow is also described in German Patent Application DE 10 2004 040 138.1 filed on Aug. 19, 2004. This German Patent Application provides the basis for a claim of priority of invention under 35 U.S.C. 119(a)-(d).

BACKGROUND OF THE INVENTION

The invention relates to a fuel cell system.

In the use of fuel cell systems, for instance as so-called APUs (auxiliary power units) and/or in vehicle drive systems as well as in stationary systems, the electrical energy management should be aware of the status of the fuel cell or fuel cell stack with regard to dynamics, performance, degradation, and/or minimum voltage. Especially in reformer systems, information is additionally required about the degradation and the dynamics of the gas generating unit. Only then can the availability and reliability of the system be assured.

Previously known systems meet these requirements only inadequately. For instance, U.S. Pat. No. 5,945,229 describes a fuel cell system in which the behavior of the current/voltage characteristic curve of the stack is ascertained via additional fuel cells at the stack inlet and the stack outlet. From this, the CO concentration in the hydrogen-rich anode gas is determined. In the event of a deviation from a reference behavior—that is, a set-point/actual-value comparison is made—protective measures are automatically tripped to avoid CO poisoning of the stack.

SUMMARY OF THE INVENTION

It is therefore an object of the invention to propose a fuel cell system which has improved availability and reliability of the system, compared to the prior art.

In keeping with these objects and with others which will become apparent hereinafter, one feature resides, briefly stated, in a fuel cell system, comprising at least one fuel cell unit for generating electrical energy; means for storing or dispensing electrical energy; an electrical consumer for consuming electrical energy; a diagnostic unit for ascertaining a functional capability of said at least one fuel cell unit during a diagnosis phase, and a control unit for determining an electrical power generated at least during the diagnosis phase by said at least one fuel cell unit.

Accordingly, a fuel cell system of the invention is distinguished in that a control unit is provided for determining the electrical power generated at least during the diagnosis phase by the fuel cell unit. With the aid of this provision, an advantageous diagnosis profile of the electrical power of the fuel cell unit can be generated. For instance, the most various current densities of the fuel cell unit can be generated and used for diagnosing the functional capability of the fuel cell unit.

Preferably, decoupling of the electrical power, generated by the fuel cell unit, from the electrical power consumed at that time or during the diagnosis phase is provided. This is of particular advantage because as a result, the operation of the fuel cell unit, or its generated power, can become maximally independent of the actual consumption. Thus the electrical power generated by the fuel cell unit can be dependent essentially on the diagnosis or the demands thereof. This makes it possible to optimize the diagnosis and leads to a decisive improvement in diagnosis, compared to the prior art.

By advantageously incorporating the electrical storage means, which is embodied for both storing and dispensing electrical energy, the independence of the generation of the electrical energy of the fuel cell unit from the actual or instantaneous energy consumption is advantageously implemented. For example, as needed, the electrical storage means can output electrical energy on the one hand and on the other store excess electrical energy generated by the fuel cell unit. This means that the electrical storage means advantageously compensates for the difference that may exist between the generated electrical power of the fuel cell unit and the consumed electrical power of the electrical consumer or consumers. The operating safety and usability of the entire fuel cell system is thus advantageously assured, precisely including during the diagnosis phase.

In general, according to the invention, a replicable diagnosis or measurement of the fuel cell unit can advantageously be made, particularly of the characteristic polarization curve or the like. This enhances the accuracy of the diagnosis significantly, in comparison to the prior art. According to the invention, completely novel possibilities for diagnosis of the fuel cell unit or the entire fuel cell system become available. For instance, in vehicular applications, the lower load range of the fuel cell unit is as a rule passed through relatively quickly, so that in a fuel cell system of the prior art, knowledge that can be obtained solely from the lower load range cannot be obtained, or can hardly be obtained. According to the invention, the fuel cell unit can for instance be operated intentionally in the lower load range and its functional capability or status can be diagnosed accordingly.

It is conceivable to operate the fuel cell unit in such a way that it generates a substantially steady, varying electrical power during the diagnosis phase. For instance, the electrical power of the fuel cell unit may have a sinusoidal or similar course during the diagnosis phase. It is also conceivable that with this variant of the invention, the inertia of the fuel cell unit or of individual components can for instance be ascertained and compared with a set-point state. From that, conclusions can for instance be drawn about the functional capacity or status of the fuel cell unit.

Preferably, at least during one time segment of the diagnosis phase, the electrical power generated by the fuel cell unit is essentially constant. An advantageously constant generated electrical power, or a corresponding steady state of the fuel cell unit, is of particular significance, and sometimes an absolute prerequisite, for ascertaining the functional capability of the fuel cell unit and for obtaining certain information about the status and functional capacity of the fuel cell unit. The diagnosability of the fuel cell unit is thus expanded markedly in comparison with the prior art, on the one hand, and on the other, the accuracy of the diagnosis is further improved.

For instance, during the diagnosis phase, the electrical power generated by the fuel cell unit is in an upper range and/or in a lower range of the generatable or maximum power. As a result, information on the upper and lower power ranges of the fuel cell unit can advantageously be obtained and used for diagnosing the functional capacity or status of the fuel cell unit. Operating the fuel cell unit precisely in both the upper and the lower ranges of the generatable or maximum power assures an especially broadly dimensioned range of examination and diagnosis of the fuel cell unit. This leads to further improvement in the diagnosability of the fuel cell unit. Thus especially advantageous information can be obtained about the functional capacity or status of the fuel cell unit, with the aid of the control unit or the diagnostic unit.

In a particular refinement of the invention, the upper range is the uppermost two-fifths and/or the lower range is the bottom two-fifths of the generatable or maximum power of the fuel cell unit. Advantageously, the upper range is the uppermost third and/or the lower range is the lowermost third of the generatable or maximum power of the fuel cell unit. It has been possible to prove that precisely in these ranges, ascertaining the functional capacity or status of the fuel cell unit makes particular information attainable. Moreover, with the aid of these provisions, an especially wide power or load range of the fuel cell unit can be examined.

Preferably, in the upper range a first time segment of essentially constant generated electrical power and/or in the lower range a second time segment of essentially constant, generatable or maximum power of the fuel cell unit is provided. On the one hand this makes a steady state of the fuel cell unit possible in the upper and/or lower power range, thereby further improving the diagnosability of the fuel cell unit or fuel cell system.

For instance, the electrical energy or power consumed during the diagnosis phase can be varied by optionally switching less-relevant consumers off and/or on and/or advantageously varying their consumption somewhat. For instance particularly in vehicular applications, the power of the power window system, a heating and/or climate control system, and so forth can be switched on and off and/or throttled or increased somewhat in power, without a significant loss of passenger comfort in a vehicle, for instance.

Preferably, the control unit is embodied for varying at least the efficiency of the electrical consumer. With the aid of this provision, for virtually the same functionality of the consumer, such as the same drive power of the drive motor, more nd/or less electrical power, especially electrical power generated by the fuel cell unit, is consumed. With the aid of this provision, above all when an electrical storage means is nearly full, it is possible to increase the electrical power generated by the fuel cell unit. In the most various types of electric motor, for instance, and particularly in synchronous machines or the like that are excited permanent-magnetically, the operating point of the electric motor or electric drive can be varied or worsened, via a field attenuation and/or with the aid of a change in the duty cycle of the power electronics, especially when DC/DC and/or DC/AC converters or the like are used, such that more or less current is consumed by the consumer, advantageously in a torque-neutral way. The efficiency of the consumer is thus advantageously varied or preferably reduced, so that for the same drive power, for instance, more electrical power is consumed. This can be applied accordingly to other electric machines, such as asynchronous machines, SR motors, etc. For instance, with the aid of a variation in the triggering angle and/or duty cycle, the consumed power can be increased, while at the same time the output moment of the electric motor remains essentially constant.

In a preferred variant of the invention, the control unit is embodied for varying the efficiency of the fuel cell unit. For instance, the efficiency of the fuel cell unit is achieved by varying an operating pressure, the Lambda value, or the like. As a result, the functional capacity, and especially the current/voltage behavior of the fuel cell unit, can be diagnosed with corresponding operating states or with these parameter specifications. Thus in turn an advantageous expansion in the diagnosability of the fuel cell unit is attained by the invention, in comparison to the prior art.

It is advantageous in general to perform the diagnosis phase during an operating phase, especially during vehicle travel in vehicular applications. It is especially advantageous that the fuel cell system is not performed before and/or after the vehicle is parked or stopped during travel. This advantageously avoids noise from individual components of the fuel cell system or vehicle, for instance, that could confuse or irritate the user. Moreover, in intervals when the vehicle is stopped or the engine is off, it is sometimes extremely difficult to generate a relevant electrical energy consumption for diagnosis.

Advantageously, at least one detection unit is provided for detecting at least one actual value of a first parameter of the fuel cell unit at a first time $T_1$.

Moreover, the diagnosis can be instigated, or the diagnosis phase begun, for instance upon a deviation in the detected actual value from a predetermined set-point value of the corresponding parameter, with the aid of the control unit or the like. This is particularly advantageous in the event of malfunctions of the fuel cell system. For instance, if a reduction in the efficiency of the fuel cell unit is detected, the diagnosis can be instigated and performed accordingly.

In principle, the regulation behavior of the fuel cell system or of the vehicle can be optimized by means of the diagnosis or the information obtained from the diagnosis.

In general, by means of the diagnosis or the information obtained from the diagnosis about the functional capacity of the fuel cell system, advantageous regulation of one and/or more components of the fuel cell system can advantageously be instigated and performed. This is particularly advantageous if there is an acute worsening or if a malfunction of the fuel cell system occurs.

Advantageously, at least one control unit is provided for checking at least one set-point value, dependent on the first actual value of the first parameter, of a second parameter at a second time $T_2$ that is later by a time difference $\Delta T$. Accordingly, $T_2=T_1+\Delta T$; as understood in the invention, $\Delta T$ is greater than a pure computation time of the control unit. In other words, in current or future processors and so forth, $\Delta T$ is not within the range of fractions of a second; instead, $\Delta T$ is equal to the computation of the control unit, in particular the processor, plus a definable or measurable delay time. According to the invention, $\Delta T$ is several seconds, minutes, hours, days, and/or even months.

In this variant of the invention, a statement or a comparison with a reference behavior is possible at a time $T_2$ in the future. In principle, this prediction with regard to the fuel cell system or its individual components can be ascertained independently of impairment or damage that already exists at time $T_1$, or at the time the actual value of the first parameter is detected. In other words, at time $T_1$, there may be no, as yet no, impairment of the system, yet according to the invention, in future, for instance under unchanged conditions and/or possible or expected changes in one or more parameters of the fuel cell system, an impairment to or damage of the system or individual components of the system could be possible or might be expected. As a result, a time savings is advantageously attainable for any countermeasures and/or protective measures or the like that might be needed to avoid or reduce such impairments and damage. As a result, advantageously, in the invention impairments to be expected, such as inadequate supply, poisoning, or degradation of the fuel cell unit and/or of other components of the system can be avoided or cannot even occur in the first place, at least to a significant extent.

In contrast to the present invention, in the prior art, an impairment or malfunction of the system or of individual components that has already occurred, and in particular degeneration of the fuel cell unit, is detected as early as possible or at the outset, so that suitable countermeasures can be initiated immediately. In other words, the impairment has already occurred. In the invention, countermeasures or protective measures are advantageously initiated with the aid of the control unit even before the impairment or damage to the system or individual components has occurred, so that such impairment or damage cannot even occur in the first place. This decisively increases the reliability and availability of the system.

A course over time, in particular a change over time, in the actual value of the first parameter is preferably detected. As a result, among other things, a tendency can be ascertained or a chronological extrapolation of the first parameter can be calculated, preferably up to time $T_2$ or during the time difference $\Delta T$. Thus according to the invention, a comparison can be made of the actual value of the first parameter at time $T_2$ to the set-point value of the second parameter at time $T_2$.

The second parameter is preferably an aggregated or highly aggregated parameter of the fuel cell system or of its individual components, which is formed with the aid of at least one first parameter that is comparatively easy to ascertain. In particular, an aggregated parameter of the fuel cell unit is intended as the second parameter.

Advantageously, the set-point value of the second parameter is at least a service life and/or a power and/or an electrical minimum voltage of the fuel cell unit. In practice, it has been found that precisely these parameters of the fuel cell unit have particular relevance in describing the status of the fuel cell unit or of the fuel cell system.

In a particular variant of the invention, the control unit is embodied for varying an actual value of a third parameter, particularly during the time difference $\Delta T$, as a function of the set-point value of the second parameter, particularly at time $T_2$. In principle, the control unit is embodied for comparing a value of the second parameter with the set-point value (reference value of the second parameter and an arbitrary time $T_x$), particularly at time $T_2$. Advantageously, in the event that the value of the second parameter at time $T_2$ does not attain the specified set-point value of the second parameter, taking an advantageous tolerance into account, or in other words overshoots or undershoots it, according to the invention a third parameter, or a countermeasure or protective measure or the like, is varied or initiated with the aid of the control unit. The variation in the third parameter is embodied or performed advantageously in such a way that the set-point value of the second parameter is attainable, in particular at time $T_2$. This means for instance that according to the invention, a potential predictable impairment (a possible or expected overshooting or undershooting of the set-point value of the second parameter at time $T_2$) can be avoided or even prevented before its potential occurrence on the basis of a previously initiated advantageous provision, particularly during the time difference $\Delta T$.

In an advantageous embodiment of the invention, the third parameter is at least one parameter of a component of the fuel cell system and/or of a vehicle, such as a passenger car, utility vehicle, ship, and so forth.

For example, the third parameter is an on/off parameter or a status parameter of an electrical consumer of the system. As an example, a climate control system of a fuel-cell-powered vehicle can be switched off or throttled during the time difference $\Delta T$ as a function of the set-point/actual-value comparison according to the invention, in order in particular not to undershoot an electrical minimum voltage and/or an electrical power of the fuel cell unit at a later time $T_2$.

On the other hand, a mass flow of a hydrogen-containing fuel generated by a reformer unit, for instance, can be increased. Advantageously, a situation can be implemented in which the generated mass flow is in particular higher than the mass flow required at that time, and the excess mass flow can be temporarily stored in an advantageous hydrogen storage means or the like. As a result, for instance at the later time $T_2$, a fuel flow containing hydrogen is available from the buffer storage means and the reformer of the fuel cell system, so that an inadequate supply of hydrogen-containing fuel will not occur.

The same is correspondingly attainable for the oxidant, such as air; a provisional pressure increase is for instance performed, and/or a compressed air storage means can be suitably filled, on the basis of the testing according to the invention, so that at the later time $T_2$, for instance, an inadequate supply of oxidant to the fuel cell unit can be avoided.

In a special refinement of the invention, the fuel cell system has an electrical energy storage means, in particular a so-called high-performance battery and/or a so-called supercap or the like. Advantageously, the third parameter is a parameter of the electrical energy storage means. This makes it possible to perform charging and/or discharging, for instance, of the energy storage means as a function of the testing according to the invention. Thus a situation in which in particular not enough electrical energy, not the expected amount of electrical energy, will be available at a time $T_2$ can be averted. At time $T_2$, electrical energy is made available to the system from the fuel cell unit and/or the electrical energy storage means.

Advantageously, the first parameter is at least one model parameter of a mathematical model of the fuel cell unit or the fuel cell system. Precisely with the aid of this kind of model-type description of the fuel cell unit and/or the fuel cell system, simplification of the operation of the fuel cell system and/or simplification in the control and regulation of the system becomes possible.

Furthermore, the second parameter is at least one model parameter of a mathematical model of the fuel cell unit or the fuel cell system. For instance, the service life, power and/or the electrical minimum voltage of the fuel cell unit is formed, with the aid of the mathematical model of the fuel cell unit, as a function of the first parameter.

In a special embodiment of this variant of the invention, both the second parameter and the first parameter are a model parameter. Particularly great simplification of what is sometimes very complex relationships in a fuel cell system is thus achieved, so that advantageously the regulation and control of the fuel cell unit and/or of the fuel cell system are simplified decisively.

Preferably, the first parameter embodied as a model parameter is at least one Nernst voltage and/or an activation energy and/or an internal resistance and/or a mass transfer parameter, in particular a parameter pertaining to the gas diffusion process, of the fuel cell unit. In practice, it has been found that precisely with the aid of these model parameters, a sufficiently accurate description of the behavior of the fuel cell unit or of the fuel cell stack becomes possible.

An apparatus for forming the model parameter or parameters as a function of at least one actual value of a base parameter is advantageously provided. As the base parameter, a mass flow and/or a temperature and/or an electrical current and/or a pressure of the fuel cell unit or of the fuel cell system and/or of a vehicle is for instance embodied. Suitably advantageous base parameters can advantageously be detected especially easily and are already detected, in present fuel cell systems, so that no additional expense, or only very slight additional expense, is necessary for detecting corresponding parameters according to the invention.

The base parameter is preferably at least one parameter of the fuel cell unit and/or of a supply unit for supplying the fuel cell unit with a fuel. The supply unit for instance includes a reformer or the like.

In a special variant of the invention, the first parameter is formed, with the aid of the mathematical model of the fuel cell unit, from one or base parameters, and from this first model parameter, the second parameter is in turn formed with the aid of the and/or one further mathematical model of the fuel cell unit. This means for instance that from at least one mass flow, a temperature, an electrical current, and/or a pressure, with the aid of the mathematical model, the Nernst voltage, activation energy, internal resistance and/or gas diffusion process is described, and from that in turn, the service life, power and/or the electrical minimum voltage of the fuel cell unit is described.

The first parameter is advantageously a base parameter. With this provision, the generation of the second parameter according to the invention is simplified.

In principle, a single second parameter or multiple second parameters can be formed from a single first parameter, or from a set of a plurality of first parameters and/or base parameters.

In an advantageous variant of the invention, the control unit is embodied for checking the set-point value of the second parameter as a function of a fourth parameter. With the aid of the fourth parameter, a more-accurate description, in particular, of the expected or potential second parameter at the later time $T_2$ or at a future time after the time difference $\Delta T$ can be attained. Thus advantageously the control unit can perform a better comparison of the expected or potential value with the set-point value of the second parameter.

In general, a variation, already existing at time $T_1$, in the fourth parameter may be provided. In this variant of the invention, an especially accurate description or calculation of the expected or potential value of the second parameter at the future time $T_2$ is attainable.

Alternatively or in combination with the above-mentioned variant, at least one potential change in the fourth parameter during the time difference $\Delta T$ is provided. For instance, the potential change in the fourth parameter represents a suspected or likely change in the fourth parameter. Experience from the past can advantageously be taken into account here. In particular, changes over time in one of the parameters of the fuel cell system that have been detected can be taken into account. Because of these changes over time, the potential change in the fourth parameter can be ascertained or calculated according to the invention with the aid of the control unit, for instance by employing extrapolation.

Advantageously, the fourth parameter is embodied as a base parameter and/or as a first and/or second and/or third parameter. Preferably, the fourth parameter is embodied as a load or so-called load profile, that is, the dependency of the electrical power on the time. Precisely such load profiles have a major influence on the dynamics of the system.

As understood in the invention, the numbering and designation of the parameters chosen is not a compulsory order, but merely serves to distinguish the parameters that can possibly be used. For instance, the third parameter may not be needed but the fourth parameter may be taken into account for forming the second parameter.

In general, the control unit of the invention may have an advantageous electrical storage means unit, which includes or has stored the aforementioned dependencies and/or model relationships and/or set-point values of the various parameters.

In an advantageous embodiment of the invention, the control unit is embodied for adaptation of the set-point parameters, above all. With the aid of this provision, aging or degeneration of the fuel cell unit and/or of the supply unit and so forth can for instance be taken into account. Preferably, the degeneration or aging is taken into account for the mathematical model and/or is ascertained on the basis of the model.

In general, according to the invention, a prediction or precautionary provision can be implemented with regard to critical system states. For instance, it can be predicted how and whether the voltage will drop below a critical value, as a function for instance of operation or the actuation of a climate control system, a passing maneuver at full load in the case of a fuel cell vehicle, and so forth.

Advantageously, many second parameters are provided for describing many potential operating states of individual components and/or of the entire system. As much as possible, all the conceivable or imaginable operating states should be taken into account, so that the availability and reliability of the system is maximized according to the invention. Optimizing the system with regard to dynamics, efficiency, and/or durability of individual components and/or of the entire system is preferably provided.

One exemplary embodiment of the invention is shown in the drawing and will be described in detail below in conjunction with the drawings.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
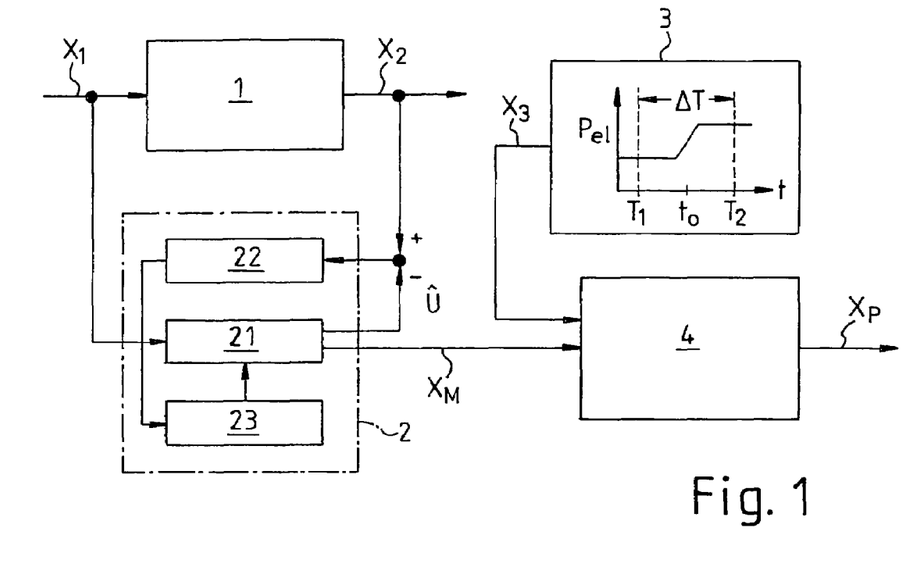
FIG. 1 is a block circuit diagram of a portion of a fuel cell system according to the invention.

In FIG. 1, part of a fuel cell system according to the invention is shown schematically as a block circuit diagram. A fuel cell unit 1 or fuel cell stack 1 has one or more input parameters $X_1$ and one or more output parameters $X_2$. The input parameters $X_1$ are for instance parameters of mass flows, temperatures, electrical currents, and/or pressures of the fuel cell system. An output parameter $X_2$ of the fuel cell 1 is for instance a voltage. In terms of the invention, the input and output parameters $X_1$, $X_2$ may be embodied as so-called base parameters. Moreover, the output parameter $X_2$ can be embodied as a so-called second parameter according to the invention. In this last case, the actual voltage $X_{2 1st}$ at an instantaneous time $T_1$, and/or an expected or potential voltage $X_{2pot}$ at a time $T_2$ that is later by a time difference $\Delta T$, can be compared with a predetermined set-point value for the voltage $X_{2Soll}$, or with the electrical minimum voltage $X_{2min}$ of the fuel cell unit 1.

It can also be seen from FIG. 1 that the parameter or parameters $X_1$ are made available to a model block 2. The model block 2 includes a model 21, which in particular is stored in memory; a feedback unit 22; and a parameter adaptation 23. Especially with the aid of the units 22 and 23, an adaptation to aging or degeneration, for instance, of individual components or a plurality of components of the fuel cell system, such as the fuel cell unit 1, can be made, so that the model 21 is correspondingly adaptable to these. As a result, a dynamically changing model 21 can be implemented. Optionally, by means of already known adaptation routines, a quasi-self-adapting model 21 can be realized.

Figure 2:
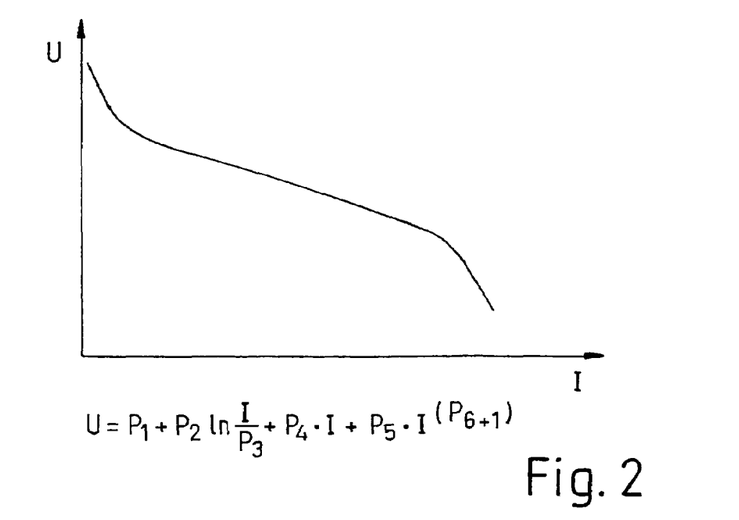
FIG. 2 shows a schematic characteristic curve of a current/voltage characteristic curve for a model of a fuel cell unit.

FIG. 2 schematically shows the model current/voltage characteristic curve and the corresponding mathematical description of an example of the model 21. Here the parameters $P_i$, where $i=1$ through 6, are dependent on the mass flow, pressure, and temperature. The first term in the formula describes the Nernst voltage; the second term describes the activation energy; the third term describes the internal resistance; and the fourth term describes the gas diffusion process of the fuel cell unit 1.

FIG. 1 also clearly shows how, with the aid of one or more model parameters $X_M$ of the model block 2 and one or more load parameters $X_3$ of an expected or potential load 3, predictors $X_P$ of a predictor block 4 are formed.

With the aid of the predictors $X_P$, provisions are optionally initiated, for instance for attaining a set-point value of the parameter $X_2$.

Figure 3:
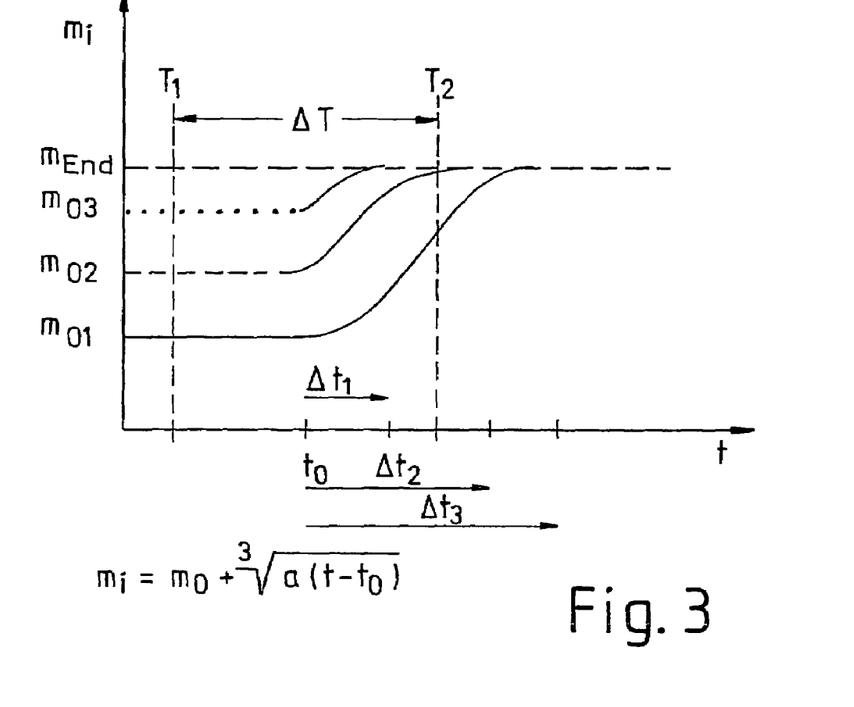
FIG. 3 shows a schematic characteristic curve of a dynamic behavior of a gas supply of a fuel cell system according to the invention.

In FIG. 3, dynamics of the gas supply are shown schematically as an example, particularly for an air path and/or a reformer or the like. In this case, mass flows i are plotted as a function of the time t for various cases. FIG. 3 additionally includes the mathematical description of the corresponding functional dependencies; the variable a is a function of pressure, temperature, and a mass flow $m_{End}$ to be attained.

For instance, at time $T_1$, a mass flow $m_{01}$ exists. At a time $T_2$ after a length of time $\Delta T$, a potential increase in the electrical power $X_3$ of the fuel cell unit 1 is supposed to be available (see particularly FIG. 1, block 3). It is assumed as an example that the load change at time $t_0$ ensues within the length time $\Delta T$. It is also assumed that for furnishing the potential electrical power $X_{3End}$ at time $T_2$, a mass flow $m_{End}$ is necessary. FIG. 3 clearly shows that in the case in which the mass flow mol would exist at time $t_0$, it would require a length of time $\Delta t_3$ to attain $m_{End}$. FIG. 3 also clearly shows that in that case, $m_{End}$ would not be attained at time $T_2$.

Conversely, a mass flow $m_{02}$ that increases from time $t_0$ on would merely reach $m_{End}$ at time $T_2$. A mass flow $m_{03}$ that increases from time $t_0$ on would already reach $m_{End}$ before time $T_2$.

According to the invention, the control unit, not shown in detail, is embodied for testing corresponding relationships. In the situation described above, at time $T_1$ the control unit would already initiate a change in the mass flow $m_{01}$ even before time $t_0$, at which the change or increase in the electrical power required is to occur, so that $m_{End}$ can be reliably reached by time $T_2$. Preferably, the excess electrical energy generated before time $T_2$ is temporarily stored using an advantageous energy storage means, such as a high-performance battery and/or a supercap.

With the aid of the temporarily stored energy, in the above situation shown in FIG. 3, it might suffice to have attained only a mass flow $m_{02}$ by time $t_0$. In that case, the slight difference at time $T_2$ between the mass flow $m_{1stT2}$ and $m_{end}$ and the resultant difference between the powers $P_{elT2}$ and $P_{elEnd}$ would be bridged or compensated for by the power of the energy storage means $P_{elBat}$. The control unit according to the invention is embodied for initiating suitable provisions or tests and/or calculations.

Figure 4:
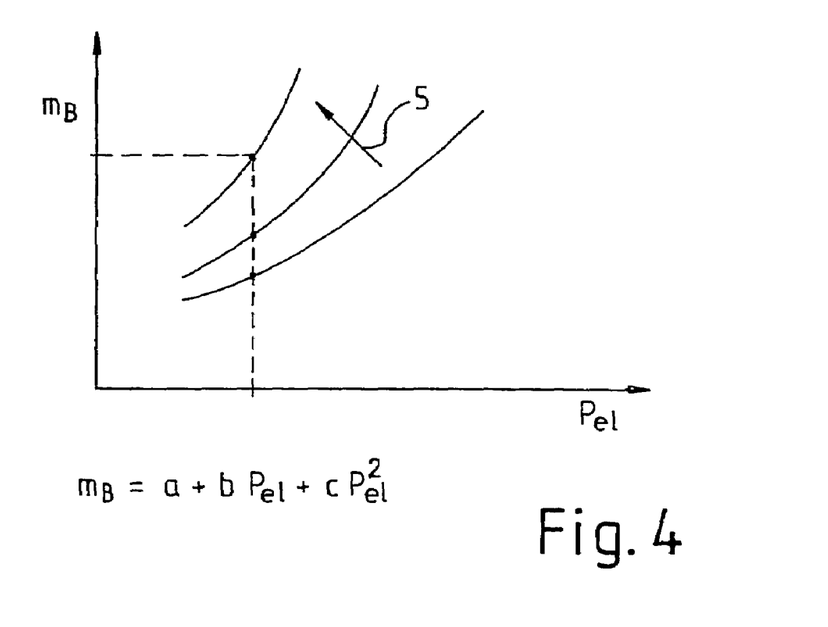
FIG. 4 shows schematic characteristic curves of the behavior of a gas generating system that is exhibiting degradation.

FIG. 4 schematically shows a behavior of a gas generating system or reformer, not identified by reference numeral, with regard to degradation. Here a mass flow $m_B$ of a fuel, such as gasoline or the like, to be reformed into a hydrogen-containing fuel is shown as a function of an electrical power $P_{el}$ and as a function of a degradation extending along an arrow 5, or an increasing degradation 5.

In general, according to the invention, the number of model parameters will advantageously be kept as low as possible, to make good convergence or approximation of corresponding adaptation routines for the enabled parameters possible. Measured variables, for instance, or variables derived from the measured values, such as current, system pressure, stoichiometry of the anode and/or cathode gases, and/or temperature of the stack 1, or the response times of the system, are possible as input variables.

With the aid of the mathematical model, model output variables for the voltage are calculated and correspondingly compared with the measured variables. From the differences that may exist, improved or altered model parameters are derived and further used and tracked over time or stored in memory in a control unit. With these current descriptions of the model status variables or parameters and their courses over time, predictors $X_P$ are then calculated in a second step.

These predictors $X_P$ can predict whether, for instance in the case of relatively major load changes, a minimum voltage would be undershot, or whether a required power $P_{elEnd}$ could in fact be produced. With potential load profiles $X_3$, such as a load change, cold starting, driving cycle, and so forth, the reaction of the system is calculated in advance, in particular the voltage situation $X_2$ and the maximum power $P_{ellstmax}$ available at a later time $T_2$. The reaction of the system is limited, for instance by the time a blower or compressor takes to reach operating speed, by heating up of a catalytic converter, or by peripheral climatic conditions such as the ambient temperature, and so forth, as a result of delays in the supply of combustion gas or the like. However, degradations (see particularly FIG. 4) can also lead to diminished performance. In accordance with the behavior or dynamics parameters stored in memory in the model 2, for a potential load change $\Delta P_{elpot}$ at an arbitrary time $T_x$, only one maximum available system power $P_{elmaxTx}$ is available.

If this maximum available system power $P_{elmaxTx}$ is below the likely or potentially necessary power $P_{elpotmaxT2}$ at a later time $T_2$, then correspondingly advantageous countermeasures can already be initiated or brought about at an earlier time $T_0$, particularly within the length of time $\Delta T$, in order to make the desired system power $P_{elpotmaxT2}$ available. This means that $P_{elpotmaxT2} \geq P_{elSollmaxT2}$, and so no critical situation for the system or impairment in the functioning of the system occurs.

The parameter adaptation according to FIG. 1 and its course over time advantageously make a long-term prediction of the degradation of a catalytic converter, and in particular the fuel cell 1 and/or the gas generating unit, possible. For instance by extrapolation of the course over time and comparison with set limits for individual parameters, such as model parameters of the internal resistance of the membrane, conversion rate of the reformer, and so forth, conclusions can be drawn about the remaining service life of the critical components. can be drawn.

For instance, with the aid of starting values of the parameters $P_1$ through $P_6$ as in FIG. 2, the voltages measured during an instance of drawing current can be compared with the corresponding model value. In the event of deviations, the parameters $P_1$ through $P_6$ are advantageously adapted. Various already known mathematical or so-called Fit methods, such as Kalman filters, and so forth exist.

With the operating strategy according to the invention, a fuel cell system can advantageously be incorporated into a modern on-board vehicle electrical system. The electrical energy management of the fuel cell system thus implemented thus has the capability of taking provisions in good time to assured a minimum supply for important consumers and components, especially at a time $T_1$ that is before a potential demand $t_0$. For instance, additional energy storage means such as high-performance batteries and/or supercaps can be charged early, so that at a later time $T_2$ a potential power $P_{elpot}$ can be made available to the system. To that end, among other things, an advantageous regulation of charging, or charging strategy, of the energy storage means can be initiated in good time.

Moreover, for instance, a less-relevant consumer, such as a climate control system and so forth, can be throttled or switched off, to assure a minimum supply to relevant components of the system, such as the drive motor, the electronic regulating and control system, and so forth.

A derivative action in the fuel cell system can be implemented. That is, for instance, the air supply or the Lambda value of the fuel cell supply is increased, and/or a higher system pressure is implemented, particularly on the air side of the fuel cell unit 1, and/or above all in reformer systems, advantageous buffer storage means are filled with reformate gas as a precaution. As a result, advantageous dynamics of the entire system can be maintained, to make potential load jumps $\Delta P_{elpot}$ or load demands for a later time $T_2$ possible.

In general according to the invention, an operating strategy, for a fuel cell drive system of vehicles among other purposes, can be derived with which a minimum derivative action for a desired kind of dynamics can be determined. This minimum derivative action could be adapted, among other things, to learned driver profiles, seasons of the year, and so forth. For example, a higher derivative action may be needed for a sporty driver and/or in the winter than for an economical driver and/or in the summer.

With the aid of the advantageous predictors $X_P$, steps that serve to regenerate the system can furthermore be tripped in the fuel cell system, such as purging, recirculation, and varying the pressure and/or humidity of individual components or flows of material.

In principle, determining the remaining service life of the fuel cell unit 1, for instance, as a predictor $X_P$ has decisive advantages in terms of servicing, making it possible to avert a possible complete failure of the system in good time.

Figure 5:
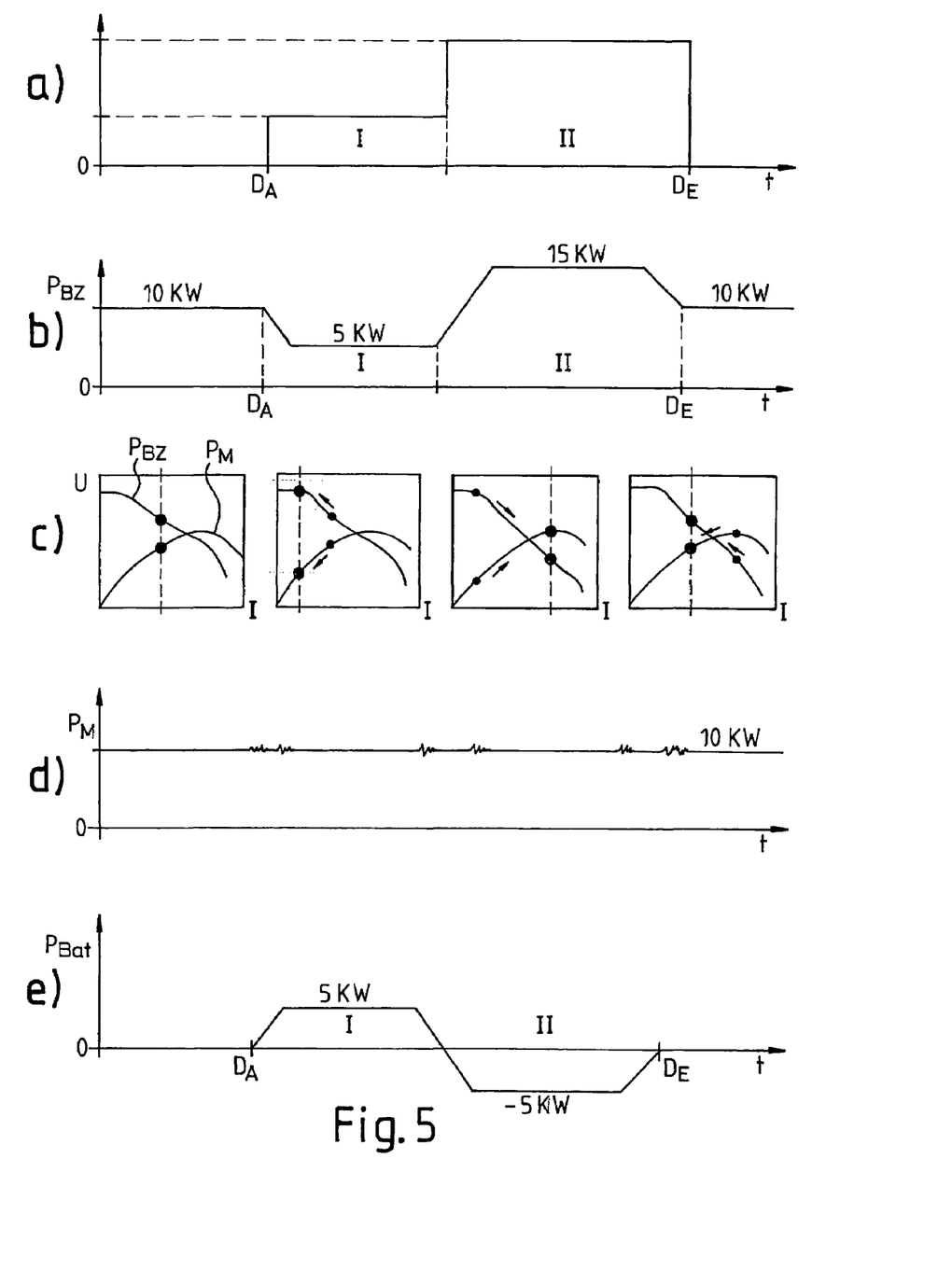
FIG. 5 shows schematic characteristic curves of various components of the fuel cell system according to the invention.

FIG. 5 includes a plurality of schematic characteristic curves for illustrating the invention. In FIG. 5a, a beginning of diagnosis $D_A$ of a diagnosis phase and an end of diagnosis $D_E$ are shown. By means of the control unit, an operating point is shifted downward along the characteristic polarization curve of the fuel cell unit In a first time segment I and upward along it in a time segment II.

FIG. 5b schematically shows the power $P_{BZ}$ of the fuel cell unit as a function of the time t. This clearly shows that from time $D_A$ on, because of the operating point shift shown in FIG. 1a in time segment I, the stack power $P_{BZ}$ is lowered, for example from 10 kW to 5 kW, and the 5 kW are virtually constant, especially during the predetermined length of time. During this time phase, the fuel cell unit is accordingly operated in the steady state, so that an advantageous diagnosis can be performed according to the invention.

In FIG. 5c, a plurality of performance graph fields are shown, which can be associated with the time segments, especially the time segments I and II. In the performance graph fields, both a current/voltage characteristic curve BZ of the fuel cell unit or fuel cell stack and a current/voltage characteristic curve Bat of a storage means or battery or accumulator are shown schematically. The points shown in the characteristic curves symbolize the respective operating point, and the arrows illustrate the operating point shift from one operating point to another along the corresponding characteristic curve. For instance, the first performance graph field in FIG. 5c shows the operating point of the characteristic polarization curve of the stack $P_{BZ}$ and the operating point of the power of the electric drive motor $P_M$ in the time segment before the time segment I. The second performance graph field in FIG. 5c shows the operating point shift along the arrows for the time segment I, so that a new operating point of the fuel cell with a reduced and in particular constant electrical power $P_{BZ}$ is realized.

Correspondingly, in the third performance graph field in FIG. 5c, the operating point of the fuel cell unit is shifted upward. Here the fuel cell unit generates a power $P_{BZ}$, in particular a power $P_{BZ}$ of approximately 15 kW that is constant over a certain length of time, within the time segment II.

The fourth performance graph field in FIG. 5c shows the operating point shift in the starting state, before the diagnosis phase or before the time $D_A$, so that the diagnosis phase is ended.

FIG. 5d shows that in the example shown in FIG. 5, the drive motor is supposed to have a constant electrical power $P_M$ of approximately 10 kW. It is expressly emphasized here that in a vehicle drive motor, for instance, at least considered over a relatively long period of time, this is a rare state. This special case has been selected, however, to simplify the illustration of the invention.

FIG. 5e shows the course of the electrical power $P_{Bat}$ of the storage means or battery or accumulator. This clearly shows that to assure the 10 kW, the storage means supplements 5 kW to the electrical power $P_M$ required by the drive motor during the time segment I, while during the time segment II, the storage means can receive or temporarily store 5 kW.

Figure 6:
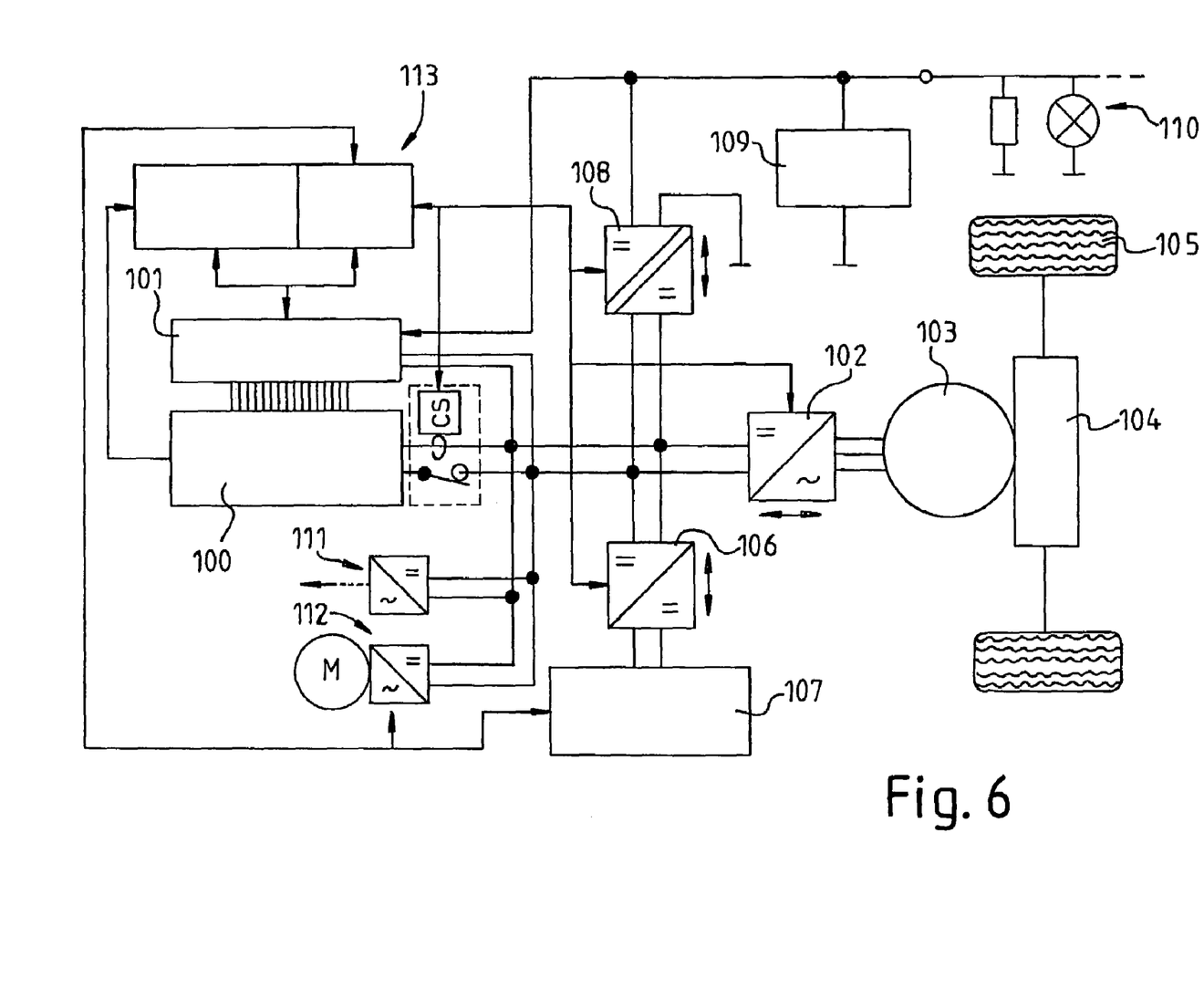
FIG. 6 is a schematic block circuit diagram of an on-board electric system structure in a fuel cell vehicle drive system according to the invention.

In FIG. 6, a block circuit diagram of an on-board electrical system structure with a fuel cell vehicle drive system according to the invention is shown. A fuel cell stack 100 with a fuel cell periphery 101 is connected on one side, via a DC/AC converter 102, to an electric drive motor 103. The electric motor 103 is intended for driving driven wheels 105 by means of a transmission 104.

The fuel cell 100 is also connected electrically, by means of a DC/DC converter 106, to a traction storage means 107.

A further DC/DC converter 108 is also provided, which in particular is connected electrically both to a 12V battery 109 or vehicle battery 109 and to a low-voltage consumer, especially with a voltage of about 14V.

In addition, further DC/AC converters 111 and 112 for high-voltage consumers may optionally be provided as an example.

In FIG. 6, a control unit 117 is also provided according to the invention, which in particular includes an FCU or APU control as well as an ECU or EEM and is advantageously connected to the most various components for their control, in particular open- and closed-loop control. In FIG. 6, in particular, advantageous sensors and other details are not shown, for the sake of simplicity.

With the aid of the invention, for plotting an evaluatable U/I characteristic curve, particularly in mobile use of the fuel cell 100 as a drive or so-called APU, the widest possible load range can be examined. Advantageously, numerous, highly variable or possible current densities of the fuel cell 100 are traversed in steady fashion. This is generally not always possible while driving, because the load behavior depends on the driver's driving habits. For instance, a somewhat "nervous" driver will not stay overly long in any particular load range, so that steady plotting of the U/I behavior is comparatively difficult or cannnot be done completely. In fuel cell systems in vehicular applications in the prior art, the lowest load range is passed through relatively quickly as a rule, so that steady states can hardly be expected then, yet such states are required for replicable measurement of the characteristic polarization curve for the sake of certain findings or diagnoses.

According to the invention, however, particularly in fuel systems with traction storage means or accumulators 107 for supplementing or buffering the primary energy supplier 100 or fuel cell stack 100, entirely novel possibilities are available.

For instance, in the event of a relatively unsteady specification of the electrical load 103 or 110 by the electrical storage means 107 or 109, the dynamically demanded proportion of electrical energy can be supplied to the electric drive motor 103, or in APU systems to the general electrical consumers, while the fuel cell 100 itself can be operated at a steady operating point over a defined length of time, particularly in the time segment I or II. The load distribution here is divided, via regulation in the energy management 113, into a direct component and an alternating component, and a contribution to the direct component is specified to the fuel cell system 100. The load distribution is permanently or only for sometime limited by the capacity of the traction storage means 107 or the storage means 109 and its performance.

An advantage here is essentially that the driver is aware of no changes whatever in the drive moment. It is even possible for the fuel cell stack 100 to be briefly intentionally operated with poor efficiency, in particular by means of pressure and/or Lambda variations, for long enough that with this parameter specification the U/I behavior of the stack 100 can be diagnosed. This operating point shift makes it possible in particular to approach various current densities in the stack or fuel cell unit 100 while driving, without the driver's becoming aware of any unwanted change in torque or the like.

Furthermore, for load point shifting of the stack 100, a variation in the triggering of the electric motor 103 can also be attained, thereby changing the efficiency of the electric drive 103. For instance in the case of a permanent-magnetically excited synchronous machine, the operating point of the electric drive 103 can be worsened, via field attenuation, preferably in combination with a change in the duty cycle of the power electronics, in such a way that more current is consumed in a torque-neutral way. This effectively reduces the efficiency.

It will be understood that each of the elements described above, or two or more together, may also find a useful application in other types of constructions differing from the types described above.

While the invention has been illustrated and described as embodied in a fuel cell system, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

The invention claimed is:

1. A fuel cell system, comprising at least one fuel cell unit for generating electrical energy; means for storing or dispensing electrical energy; an electrical consumer for consuming electrical energy; a diagnostic unit for ascertaining a functional capability of the at least one fuel cell unit during a diagnosis phase, and a control unit for determining an electrical power generated at least during the diagnosis phase by said at least one fuel cell unit, wherein said control unit is configured for varying at least an efficiency of said electrical consumer during said diagnosis phase in order to diagnose the fuel cell unit functional capability or status.

2. A fuel cell system as defined in claim 1, wherein said fuel cell unit is configured so that at least during a time segment of the diagnosis phase the electrical power generated by said at least one fuel cell unit is substantially constant.

3. A fuel cell system as defined in claim 1, wherein said at least one fuel cell unit is configured so that during the diagnosis phase the electrical power generated by said at least one fuel cell unit is in at least both an upper range and a lower range of a generated power, where said upper range extends from $3/5$ maximum to maximum electrical power, and said lower range extends from minimum to $2/5$ maximum electrical power.

4. A fuel cell system as defined in claim 3, wherein said upper range is an uppermost third and the lower range is a lowermost third of the generated power.

5. A fuel cell system as defined in claim 3, wherein in the upper range, a first time segment with constant generated power and in the lower range a second time segment with constant generated power are provided.

6. A fuel cell system as defined in claim 1, wherein said control unit is configured for varying at least an efficiency of said at least one fuel cell unit.

7. A fuel cell system as defined in claim 1; and further comprising at least one detection unit for detecting at least one actual value of a first parameter of said at least one fuel cell unit at a first time $T_1$.

8. A fuel cell system as defined in claim 7, wherein said control unit is configured for checking at least one set-point value, dependent on a first actual value of the first parameter, of a second parameter at the second time $T_2$ that is later by a time difference $\Delta T$ ($T_2 = T_1 + \Delta T$).

9. A fuel cell system as defined in claim 8, wherein said control unit is configured for varying at least one actual value of a third parameter as a function of the set-point value of the second parameter.

10. A fuel cell system as defined in claim 7, wherein the first parameter is at least one model parameter of a mathematical model of said at least one fuel cell unit.

11. A fuel cell system as defined in claim 9, wherein said control unit is configured for checking the set-point value of the second parameter as a function of a fourth parameter.

12. A fuel cell system as defined in claim 11, wherein said control unit is configured so that during the time difference $\Delta T$, at least one change in the fourth parameter is provided.

13. A fuel cell system as defined in claim 1, wherein said electrical consumer is a drive motor for driving a vehicle.

14. A vehicle, comprising a drive motor; and a fuel system including at least one fuel cell unit for generating electrical energy, means for storing or dispensing electrical energy, an electrical consumer formed by said drive motor, a diagnostic unit for ascertaining a functional capability of said at least one fuel cell unit during a diagnosis phase, and a control unit for determining an electrical power generated at least during the diagnosis phase by said at least one fuel cell unit, wherein said control unit is configured for varying at least an efficiency of said electrical consumer during said diagnosis phase in order to diagnose the fuel cell unit functional capability or status.

15. A fuel cell system as defined in claim 1, wherein said at least one fuel cell unit is configured so that during the diagnosis phase the electrical power generated by said at least one fuel cell unit is in at least both an upper range and a lower range of a generated power, where said upper range extends from $2/3$ maximum to maximum electrical power, and said lower range extends from minimum to $1/3$ maximum electrical power.

* * * * *